United States Patent [19]

Shimoda

[11] Patent Number: 4,969,680
[45] Date of Patent: Nov. 13, 1990

[54] AUTOMOTIVE BODY SIDE WALL STRUCTURE

[75] Inventor: Nobuyoshi Shimoda, Tokyo, Japan

[73] Assignee: Honda Giken Kogyo Kabushiki Kaisha, Tokyo, Japan

[21] Appl. No.: 290,323

[22] Filed: Dec. 27, 1988

[30] Foreign Application Priority Data

Dec. 28, 1987 [JP] Japan .............................. 62-201413[U]

[51] Int. Cl.$^5$ ................................................ B60J 5/04
[52] U.S. Cl. ..................................... 296/146; 296/188; 49/502
[58] Field of Search ............... 296/188, 189, 146, 901; 49/502

[56] References Cited

U.S. PATENT DOCUMENTS 4,355,841 10/1982 Ghioella et al. ................ 296/901 X

FOREIGN PATENT DOCUMENTS

| 3425776 | 1/1986 | Fed. Rep. of Germany ...... 296/188 |
| 7401790 | 9/1975 | France ................................... 49/502 |
| 2605559 | 4/1988 | France ................................... 296/146 |
| 56-50813 | 5/1981 | Japan . |

*Primary Examiner*—Dennis H. Pedder
*Attorney, Agent, or Firm*—Armstrong, Nikaido, Marmelstein, Kubovcik & Murray

[57] ABSTRACT

A side wall structure such as a door for an automotive body includes an inner panel such and an outer panel which are spaced laterally from each other, the outer panel having an opening defined in a substantially lower portion thereof by an edge thereof and having a horizontal length larger than a vertical length thereof, and a reinforcing panel complementary in shape to the opening and having a peripheral edge joined to the edge of the outer panel in covering relation to the opening.

4 Claims, 2 Drawing Sheets

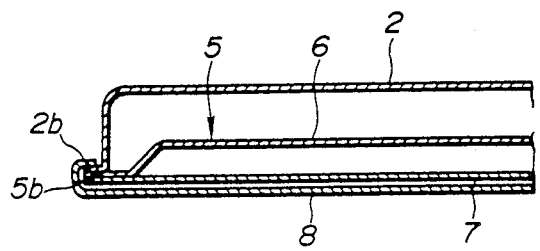
FIG.3
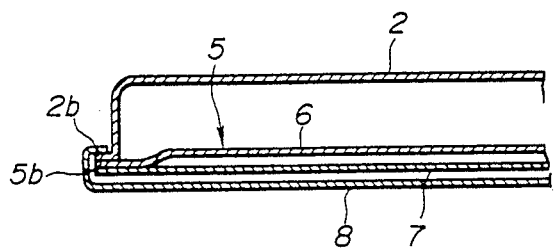
FIG.4
FIG.5
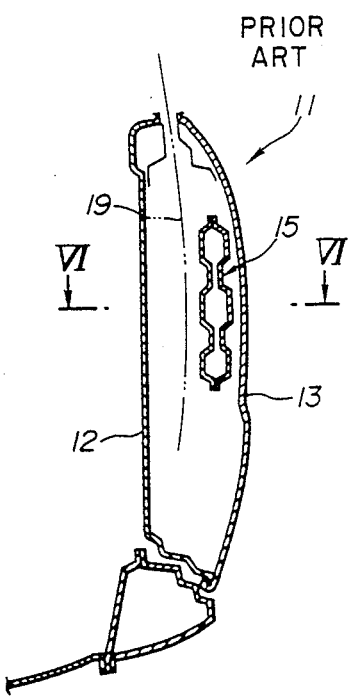
PRIOR ART
FIG.6
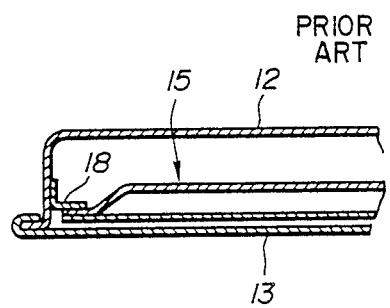
PRIOR ART 4,969,680

AUTOMOTIVE BODY SIDE WALL STRUCTURE

BACKGROUND OF THE INVENTION

1. Field of the Invention

The present invention relates to a side wall structure for use in an automotive body, and more particularly to a door structure of an automobile.

2. Description of the Relevant Art

It is necessary that a side wall structure of an automotive body, particularly a door positioned closest to a passenger seated on a nearby seat, be rigid enough not to be recessed or deformed into the passenger compartment when a shock is applied laterally to the side wall structure. One conventional automotive body side wall structure includes a reinforcing panel disposed in a door for increased rigidity, as disclosed in Japanese Laid-Open Patent Publication No. 56-50813, for example. The disclosed structure, as shown in FIG. 5 of the accompanying drawings, has a reinforcing panel 15 of a corrugated cross section which is made from a high-strength steel sheet. The reinforcing panel 15 is disposed in a space defined in a door 11 between an inner panel 12 and an outer pane 13, and positioned between a substantially vertically central portion of the outer panel 13 and a window glass 19 as it is retracted into the door 11, the reinforcing panel 15 having its ridges and grooves extending in the longitudinal direction of the automobile. Clearances between the reinforcing panel 15, the outer panel 13, and the window glass 19 should be of certain values or greater such that these members will not contact each other due to assembling errors, vibration, or the like, and also that a paint layer can be electrodeposited on the inner surface of the outer door panel 13. As shown in FIG. 6, only each of the front and rear ends of the reinforcing panel 15 is attached to the inner panel 12 by means of a bracket 18.

SUMMARY OF THE INVENTION

According to the present invention, there is provided a side wall structure for an automotive body, comprising an inner panel and an outer panel which are spaced laterally from each other, the outer panel having an opening defined in a substantially lower portion thereof by an edge thereof and having a horizontal length larger than a vertical length thereof, and a reinforcing panel complementary in shape to the opening and having a peripheral edge joined to the edge of the outer panel in covering relation to the opening.

With the above arrangement, the reinforcing panel for absorbing shocks applied laterally to the side wall structure may be of high rigidity and large cross section. The peripheral edge of the reinforcing panel can be fixed directly to the outer panel without any bracket or the like.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is a cross-sectional view taken along line III—III of FIG. 2;

FIG. 4 is a cross-sectional view taken along line IV—IV of FIG. 2;

FIG. 5 is a vertical cross-sectional view of a conventional side wall structure; and FIG. 6 is a cross-sectional view taken along line VI—VI of FIG. 5.

DETAILED DESCRIPTION OF THE PREFERRED EMBODIMENT

Figure 1:
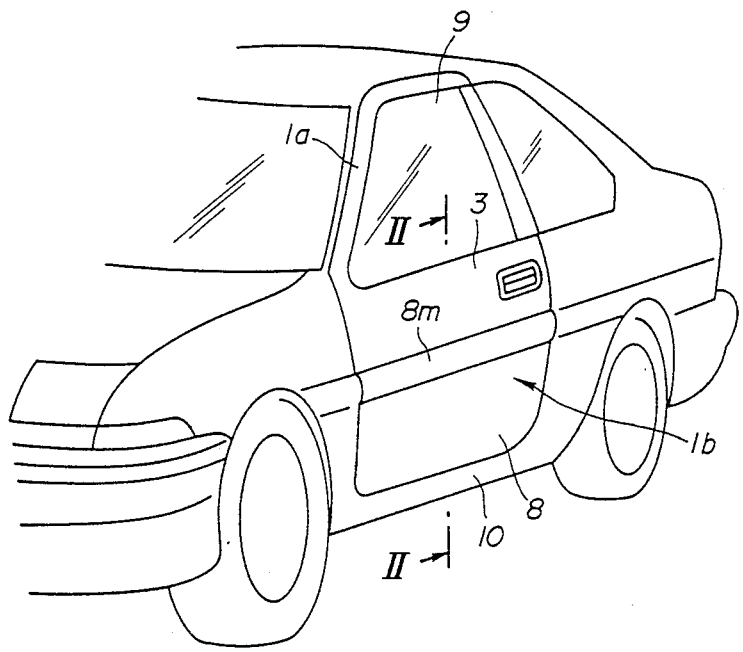
FIG. 1 is a fragmentary schematic perspective view of a two-door automobile in which the principles of the present invention are incorporated.
Figure 2:
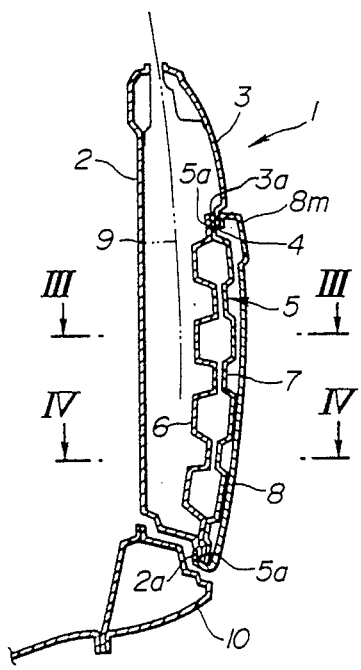
FIG. 2 is a cross-sectional view taken along line II—II of FIG. 1.

As shown in FIG. 1, a door 1 is openably and closably disposed above a side sill 10 in a side wall structure of the automotive body of a two-door automobile. The door 1 includes a window frame 1a, a door panel assembly 1b, and a window glass 9. As illustrated in FIG. 2, the door panel assembly 1b comprises an inner panel 2, an outer panel 3, a reinforcing panel 5, and a decorative panel 8.

The outer panel 3 is positioned only in an upper portion of the door panel assembly lb and having an opening 4 defined in more than a lower half portion of the door panel assembly 1b, i.e., extending vertically from the lower end of the door panel assembly lb beyond a vertically central portion thereof. The opening 4 has a horizontal length larger than a vertical length thereof.

The reinforcing panel 5 comprises two corrugated plates 6, 7 joined to each other with their ridges and grooves confronting each other. As shown in FIG. 2, the reinforcing panel 5 is of a closed hollow structure and is spaced from the window glass 9 with a clearance therebetween, the grooves of the reinforcing panel 5 extending in the longitudinal direction of the automobile.

The reinforcing panel 5 has a side elevational shape which is complementary to the opening 4, and has a peripheral edge joined to the peripheral edge of the outer panel 3 which defines the opening 4, so that the reinforcing panel 5 covers the opening 4. More specifically, the reinforcing panel 5 has upper and lower ends 5a overlapping and spot-welded to the lower end 2a of the inner panel 2 and the lower end 3a of the outer panel 3. As shown in FIGS. 3 and 4, each of the front and rear ends 5b of the reinforcing panel 5 overlaps and is secured to one of the front and rear ends 2b of the inner panel 2. With this arrangement, the reinforcing panel 5 has a vertical span and a horizontal span (in the longitudinal direction of the automobile) which are greater than those of the conventional reinforcing panel. Since the entire peripheral edge of the reinforcing panel 5 is fixed directly to the door 1, no bracket is necessary for the attachment of the reinforcing panel 5, and the door 1 or the side wall structure is greatly increased in rigidity.

It is preferable that the upper limit position for installing the reinforcing panel 5 be about 600 mm from ground.

The decorative panel 8 is made of a resin and includes an outwardly projecting molding 8m on its upper portion. The decorative panel 8 is attached to the outer side of the door panel assembly 1b in covering relation to the reinforcing panel 5. The decorative panel 8 is detachably mounted on a lower portion of the door panel assembly 1b by holding the upper and lower ends of the decorative panel 8 in fitting engagement with the lower end 3a of the outer panel 3 and the lower end 2a of the inner panel 2. Inasmuch as the decorative panel 8 is installed outwardly of the reinforcing panel 5, any clearance between the decorative panel 8 and the reinforcing panel 5 may be very small. Therefore, the reinforcing panel 5 may be of a large cross-sectional width and a high degree of rigidity without increasing the thickness of the door 1 or side wall structure. The decorative panel 8 may be dispensed with, and the reinforcing panel 5 may double as an outer panel.

When a shock is applied laterally to the lower portion of the door panel assembly 1b, the load is borne by the reinforcing panel 5 which is disposed in the entire lower portion of the door panel assembly 1b. Because the rigidity of the reinforcing panel 5 is sufficiently high, relatively low shocks can be absorbed by the reinforcing panel 5 and do not reach the inner panel 2.

While the two-door automobile has been described above in the illustrated embodiment, the present invention is equally applicable to a four-door automobile and automobiles of other types. The principles of the invention are also applicable to automotive body side wall structures other than the door.

With the present invention, as described above, the mechanical strength of the side wall structure, particularly a lower portion thereof, of the automotive body, is greatly increased.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

I claim:

1. A side wall structure for an automotive body having a side sill and a window glass, comprising:

an outer panel defining an external surface of said automotive body;

an inner panel disposed laterally spaced from said outer panel and having a lower end bent outwardly in confronting relation to said side sill and front and rear ends bent outwardly toward the external surface of said automotive body;

said side wall structure having an opening partially bounded by a lower portion of said outer panel, said opening having a horizontal length greater than a vertical length thereof; and a reinforcing panel complementary in shape to said opening and having upper and lower ends joined to a lower end of said outer panel and the lower end of said inner panel, respectively, and front and rear ends joined to front and rear ends of said inner panel, respectively;

said reinforcing panel comprising two corrugated plates joined to each other and having ridges and grooves extending in a longitudinal direction of the automotive body and a closed hollow cross section, said inner panel and said reinforcing panel being spaced apart from each other and defining a space in which said window glass can be accommodated therebetween.

2. A side wall structure according to claim 1, wherein said automotive body includes a door and said opening and reinforcing panel are provided in said door.

3. A side wall structure according to claim 2, wherein said door is comprised of a door panel assembly and said opening extends upwardly from a lower end of said door panel assembly beyond a vertical center thereof.

4. A side wall structure according to claim 1, further including a decorative panel covering an outer side of said reinforcing panel.

* * * * *